US007773080B2

(12) United States Patent
Sato et al.

(10) Patent No.: US 7,773,080 B2
(45) Date of Patent: Aug. 10, 2010

(54) DISPLAY DEVICE AND THE DRIVING METHOD WHICH RESTRICTS ELECTRIC POWER

(75) Inventors: Toshihiro Sato, Mobara (JP); Hajime Akimoto, Kokubunji (JP); Naruhiko Kasai, Yokohama (JP); Naoki Tokuda, Mobara (JP)

(73) Assignee: Hitachi Displays, Ltd., Chiba (JP)

( * ) Notice: Subject to any disclaimer, the term of this patent is extended or adjusted under 35 U.S.C. 154(b) by 1014 days.

(21) Appl. No.: 11/224,954

(22) Filed: Sep. 14, 2005

(65) Prior Publication Data

US 2006/0066533 A1 Mar. 30, 2006

(30) Foreign Application Priority Data

Sep. 27, 2004 (JP) ............................. 2004-279567

(51) Int. Cl.
*G06F 3/038* (2006.01)
*G09G 5/00* (2006.01)

(52) U.S. Cl. ........................................ 345/212; 345/77

(58) Field of Classification Search ........... 345/31-104, 345/205, 207, 212, 214, 690; 315/169.3
See application file for complete search history.

(56) References Cited

U.S. PATENT DOCUMENTS 6,756,977 B2 * 6/2004 Ide ............................. 345/212
6,816,135 B2 * 11/2004 Ide et al. ........................ 345/60
2002/0175635 A1 * 11/2002 Komiya ................... 315/169.3
2003/0218583 A1 * 11/2003 Hasagawa ..................... 345/76
2004/0070331 A1 * 4/2004 Kuno et al. ................. 313/495
2004/0178740 A1 * 9/2004 Chang et al. ................ 315/100
2004/0201554 A1 * 10/2004 Satoh .......................... 345/76
2005/0264482 A1 * 12/2005 Suzuki et al. ................. 345/63
2006/0001613 A1 * 1/2006 Routley et al. ................ 345/76
2006/0038758 A1 * 2/2006 Routley et al. ................ 345/81

FOREIGN PATENT DOCUMENTS

| | | |
|---|---|---|
| JP | 2000-221945 | 8/2000 |
| JP | 2000-330517 | 11/2000 |
| JP | 2001-282176 | 10/2001 |
| JP | 2003-330421 | 11/2003 |

* cited by examiner

*Primary Examiner*—Chanh Nguyen
*Assistant Examiner*—Sanghyuk Park
(74) *Attorney, Agent, or Firm*—Antonelli, Terry, Stout & Kraus, LLP.

(57) ABSTRACT

A plurality of organic EL elements which are arranged on a display panel lowers the brightness along with a lapse of light emitting time and hence, the power consumption is increased to maintain the brightness. However, the increase of the power consumption shortens a lifetime of the organic EL elements. To overcome this drawback, a power supply circuit which drives the display panel has a function of controlling an electric power supplied to the display panel to a fixed value or less in response to a detection signal from a detection part which detects a cathode current of the organic EL elements.

2 Claims, 6 Drawing Sheets

DISPLAY DEVICE AND THE DRIVING METHOD WHICH RESTRICTS ELECTRIC POWER

CROSS-REFERENCE TO RELATED APPLICATIONS

The disclosure of Japanese Patent Application No. 2004-279567 filed on Sep. 27, 2004 including the specification, drawings and abstract is incorporated herein by reference in its entirety.

BACKGROUND OF THE INVENTION

1. Field of the Invention

The present invention relates to an energy-saving display device and a driving method of the same.

2. Description of the Related Arts

As a display device which displays an image, particularly, as a thin flat panel display, there has been known a self-luminous image display device such as a PDP (Plasma Display Panel), a FED (Field Emission Display) or an organic EL (Organic Electro Luminescence) display.

In such a self-luminous image display device, a following patent literature 1 discloses a display device which performs a control to lower the display brightness of a screen in displaying an image of high average brightness thus realizing, without damaging a display quality, the reduction of a light emission quantity of self-luminous elements inside the display device and the prolongation of a lifetime of the self-luminous elements, the low power consumption by suppressing the peak brightness and the compensation of the change of the light-emitting brightness attributed to a temperature change.

A following patent literature 2 discloses an image display device which suppresses panel electric power when the average brightness is high and reproduces the peak brightness when the brightness is partially high although the average brightness is low.

A following patent literature 3 discloses a matrix display device which modulates a power source voltage which is supplied to a pulse-width modulation/driver and a scanning driver by detecting an average brightness level of an image signal, an average level of an element current which flows in respective pixels of the panel, and a high voltage current which is applied to the panel.

A following patent literature 4 discloses a display device which controls a total charge quantity supplied to an organic EL by applying a voltage to gates of driving transistors in accordance with a result of measurement of a charge quantity supplied to the organic EL.

Further, a following patent literature 5 discloses a self-luminous display element driving device which can prevent the change with time of brightness of a self-luminous display element by detecting an electric current which flows in a self-luminous display element.

Patent literature 1: Japanese Patent Laid-open 2003-330421

Patent literature 2: Japanese Patent Laid-open 2001-282176

Patent literature 3: Japanese Patent Laid-open 2000-221945

Patent literature 4: Japanese Patent Laid-open 2000-330517

Patent literature 5: Japanese Patent Laid-open 2001-13903

SUMMARY OF THE INVENTION

In the patent literature 1 to the patent literature 4 in the Description of the Related Arts, there have been proposed the techniques which reduce the power consumption by detecting the electric current which flows in the self-luminous elements inside the panel and, thereafter, by suppressing such an electric current in response to the brightness of the image signal.

Further, in a portable equipment, an allowable limit is set with respect to the power supply electricity so as to achieve the reduction of power consumption. However, depending on the kind of the image to be displayed, the power consumption is increased and the power supply electricity easily exceeds an allowable limit thereof.

Here, in general, although an attempt to reduce the power consumption by decreasing the brightness of a display screen has been made for the so-called power saving of the display device, the total power consumption is steadily increasing along with the large-sizing of a panel or the sophistication of functions of the display device.

Further, as described in the patent literature 5, the brightness of the organic EL which constitutes the self-luminous element is lowered along with the lapse of the operation time and hence, it is necessary to increase the power consumption to compensate for the lowering of the brightness of the organic EL thus shortening the lifetime of the organic EL.

Accordingly, it is an object of the present invention to provide a display device and a display method which can suppress the increase of the power consumption and can realize the prolongation of lifetime by detecting the power consumption and restricting the power consumption to a fixed value or less.

Image signals are displayed in a state that the electric power supplied to a plurality of organic EL elements which are arranged on the display panel and constitute self-luminous elements is restricted and a driving voltage value and a driving current value of the organic EL elements are fixed within a range of the electric power. The power consumption of the organic EL is detected per display frame unit and is controlled such that the power consumption does not exceed a fixed value.

For example, an electric current value which is supplied to the organic EL elements is detected and when the current value is large (small), the driving voltage value is made small (large).

Further, the average brightness is detected in response to an image signal and when the average brightness is high (low), a control is performed so as to make the driving voltage value small (large).

To restrict the power consumption to a fixed value or less, in performing the display of an image in a reduced size by restricting the display area, an image brighter than an image when a display region is not restricted is displayed.

The driving voltage and the driving current are dynamically controlled in a state that the average brightness is lowered when the screen is bright as a whole and the average brightness is increased in an opposite case and hence, it is possible to restrict and suppress the increase of the power consumption and to realize the prolongation of lifetime while maintaining the high image quality. Further, it is possible to prevent the shortening of the lifetime attributed to the generation of heat by the display panel and the driving circuit board per se by restricting and suppressing the power consumption thus giving rise to a synergistic effect with respect to the prolongation of the lifetime.

DETAILED DESCRIPTION OF THE INVENTION

Hereinafter, embodiments of a display device according to the present invention are explained in conjunction with drawings.

Embodiment 1

Figure 1:
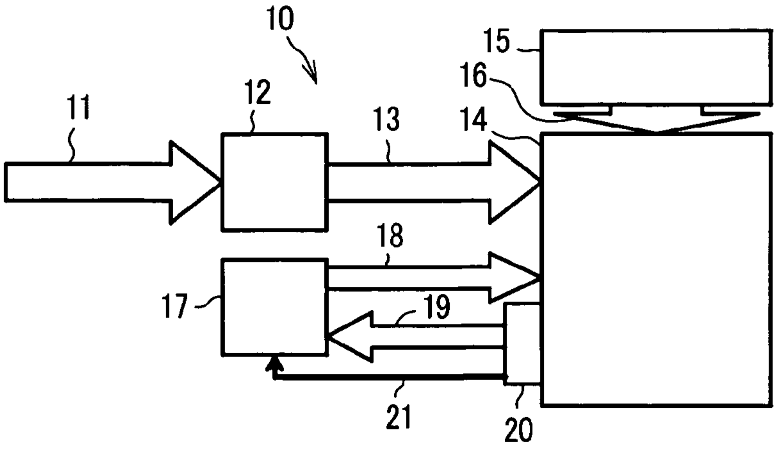
FIG. 1 is a schematic view of a display device according to the present invention (embodiment 1)

FIG. 1 is a schematic view of a display device 10 according to the present invention, wherein an input image signal 11 is processed at a signal processing circuit 12, and a processed image signal 13 is supplied to a display panel 14. The image signal 13 inputted to the display panel 14 is displayed on the display panel 14 in response to a control signal 16 which is supplied to the display panel 14 from a control circuit 15.

On the other hand, a driving power 18 which constitutes a driving voltage and a driving current from a power supply circuit 17 is supplied to the display panel 14 and hence, a luminous state of a plurality of organic EL elements which constitute self-luminous elements arranged inside the display panel 14 is controlled. A cathode current 19 of the plurality of organic EL elements whose luminous state is controlled is detected by a detection part 20 and a detection signal 21 is fed back to the power supply circuit 17. Further, the cathode current 19 is also made to return to the power supply circuit 17.

The power supply circuit 17 performs, in response to the detection signal 21 indicative of the brightness condition of a display image, a control such that the driving power 18 supplied to the display panel 14 is restricted to a fixed value or less, that is, the power consumption of the display panel 14 is restricted to a fixed value or less.

For example, when the detection signal 21 is large, the cathode current 19 is also large and hence, the driving voltage out of the driving power 18 is made small thus restricting the power which is a product of the current and the voltage to a fixed value or less. Further, the power consumption of the display panel 14 is obtained by calculating the square of the detection signal 21 of the cathode current 19 and the driving power 18 may be restricted to a fixed value or less.

Figure 2:
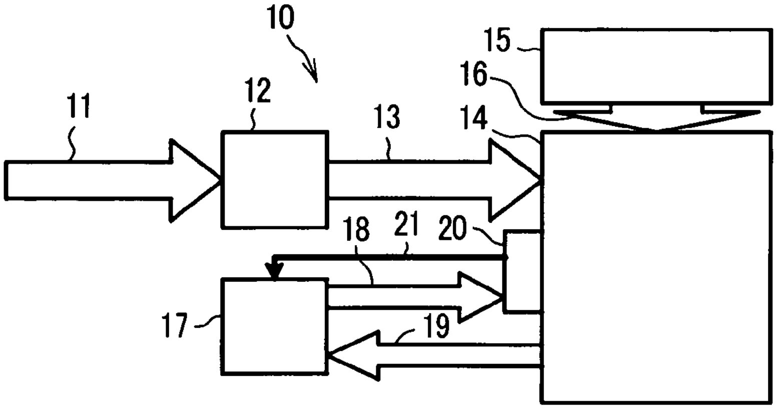
FIG. 2 is a schematic view of another display device according to the present invention (embodiment 1)

FIG. 2 is a schematic view of another display device of this embodiment, wherein the display device shown in FIG. 2 differs from the display device shown in FIG. 1 with respect to a point that the detection part 20 detects the driving power 18, while the display device shown in FIG. 2 is equal to the display device shown in FIG. 1 with respect to other constitutions. In FIG. 2, the detection part 20 detects the driving current (anode current of the organic EL elements) out of the driving power 18 and feedbacks the detection signal 21 to the power supply circuit 17. The power supply circuit 17 performs, in response to the detection signal 21, a control of the driving voltage out of the driving power 18 and restricts the driving power 18 to a fixed value or less. In this manner, the power supply circuit 17 performs the control which restricts the power consumption of the display panel 14 to the fixed value or less.

Further, the detection part 20 may perform a control to restrict the driving power 18 to a fixed value or less such that the detection part 20 directly detects the driving power 18 which is the product of the driving voltage and the driving current and feedbacks the detection signal 21 to the power supply circuit 17.

Figure 3:
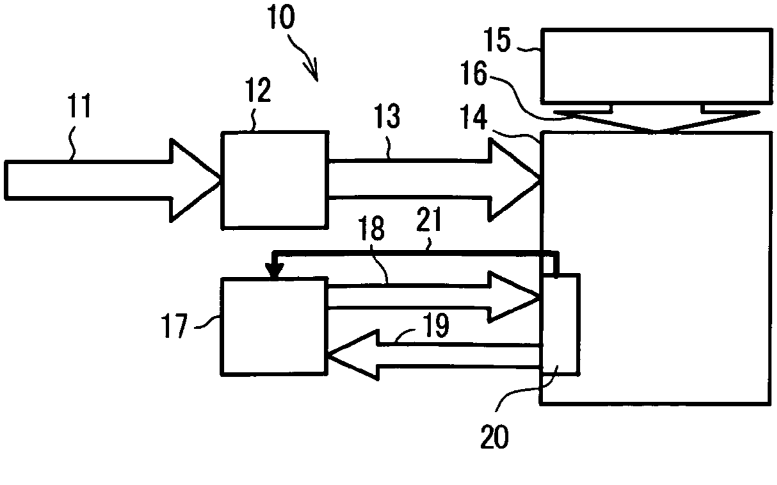
FIG. 3 is a schematic view of still another display device according to the present invention (embodiment 1)

FIG. 3 is a schematic view of still another display device of this embodiment, wherein the display device shown in FIG. 3 differs from the display devices shown in FIG. 1 and FIG. 2 with respect to a point that the detection part 20 is provided inside the display panel 14 and the display device shown in FIG. 3 is equal to the display devices shown in FIGS. 1 and 2 with respect to other constitutions. The display device shown in FIG. 3 may perform, besides the control performed by the display device shown in FIG. 1 or FIG. 2, a control which is the combination of the controls which are performed by the display devices shown in FIGS. 1 and 2. Further, the detection part 20 may be arranged inside the power supply circuit 17.

Embodiment 2

In the embodiment 1, the detection signal 21 indicative of the brightness condition of the display image is obtained from the detection part 20 which directly detects the driving current which corresponds to the cathode current or the anode current of the organic EL elements of the display panel 14. In this embodiment 2, the detection signal 21 indicative of the brightness condition of the display image is obtained from a detection part which detects an image signal.

Figure 4:
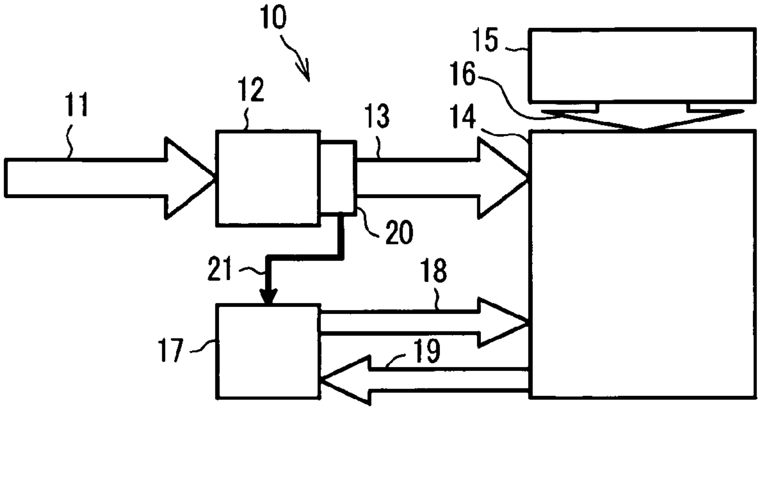
FIG. 4 is a schematic view of a display device according to the present invention (embodiment 2)

FIG. 4 is a schematic view of the display device of the present invention, wherein the display device of this embodiment 2 differs from the display device of the embodiment 1 with respect to a point that the detection part 20 detects a brightness level of the image signal 13 and the display device of the embodiment 2 is equal to the display device of the embodiment 1 with respect to other constitutions. In FIG. 4, the detection part 20 detects the brightness level of the image signal 13 and controls the power supply circuit 17 in response to the detection signal 21.

For example, the detection part 20 detects a peak brightness level or an average brightness level per frame unit of the image signal 13, and controls the driving voltage out of the driving power 18 which the power supply circuit 17 supplies so as to restrict the driving power 18 to a fixed value or less thus restricting the power consumption of the display panel to a fixed value or less. That is, when the average brightness is high (low), the control is performed so as to make the driving voltage value small (large). Further, it may be possible to control the driving current out of the driving power 18 or the combination of the driving current and the driving voltage of the driving power 18.

Figure 5:
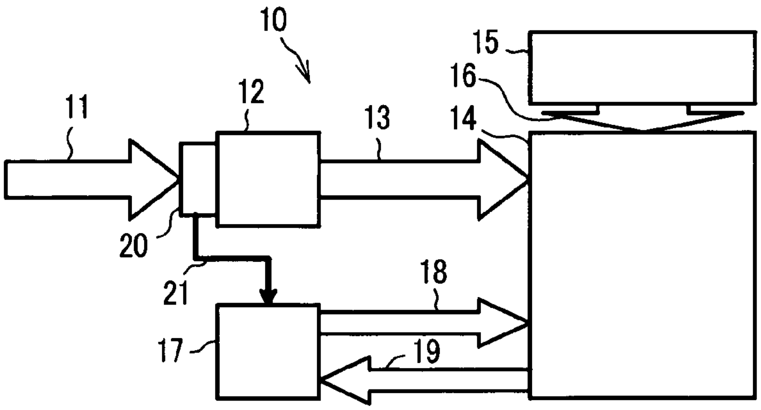
FIG. 5 is a schematic view of another display device according to the present invention (embodiment 2)

FIG. 5 is a schematic view of another display device of this embodiment, wherein the display device shown in FIG. 5 differs from the display device shown in FIG. 4 with respect to a point that the detection part 20 detects the brightness level of the input image signal 11, while the display device shown in FIG. 5 is equal to the display device shown in FIG. 4 with respect to other constitutions. The manner of operation of the display device shown in FIG. 5 is equal to the manner of operation of the display device shown in FIG. 4.

Although the detection part 20 is provided separately from the signal processing circuit 12 in FIGS. 4 and 5, the detection part 20 may be provided inside the signal processing circuit 12. Further, the detection part 20 may control the power supply circuit 17 by detecting the levels of both signals consisting of the input image signal 11 and the image signal 13.

Embodiment 3

This embodiment is characterized in that, in the embodiment 1, the detection signal 21 fed back to the power supply circuit 17 is further fed back to the signal processing circuit 12.

Figure 6:
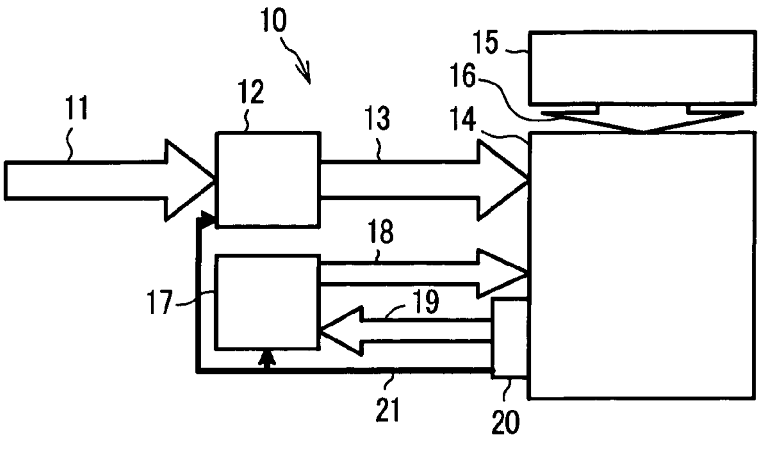
FIG. 6 is a schematic view of another display device according to the present invention (embodiment 3)

FIG. 6 is a schematic view of the display device according to the present invention and corresponds to FIG. 1. The display device shown in FIG. 6 differs from the display device shown in FIG. 1 with respect to a point that the detection signal 21 is fed back to the signal processing circuit 12. In FIG. 6, the detection signal 21 from the detection part 20 is fed back to the power supply circuit 17 and the signal processing circuit 12 and hence, it is surely possible to control the driving power 18 from the power supply circuit 17 to a fixed value or less. Accordingly, it is surely possible to control the power consumption of the display panel 14 to a fixed value or less. Further, in FIG. 2 and FIG. 3, the detection signal 21 may be fed back to the signal processing circuit 12.

Figure 7A:
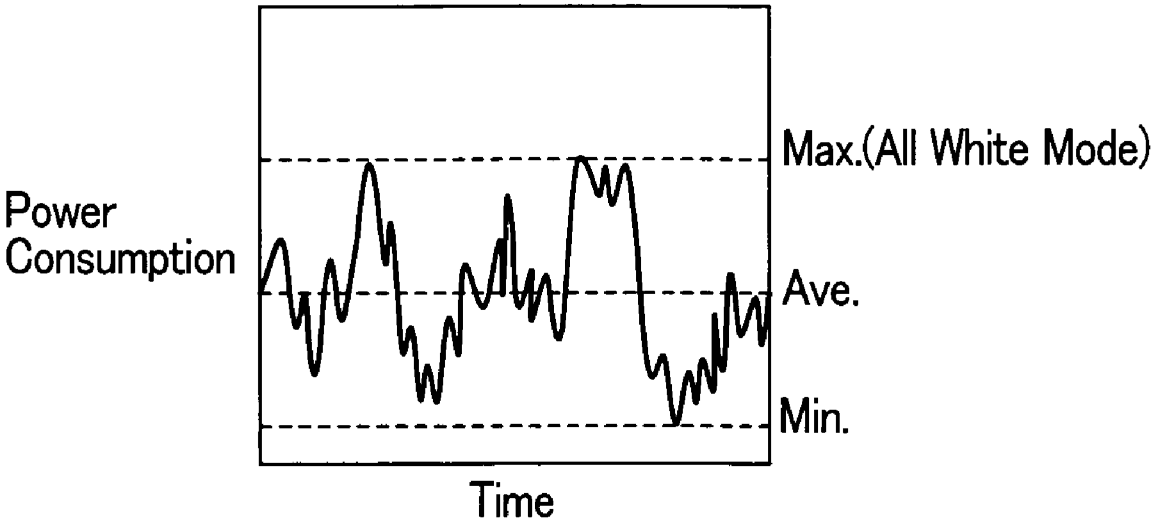
FIG. 7A and FIG. 7B are views showing the transition of the power consumption.
Figure 7B:
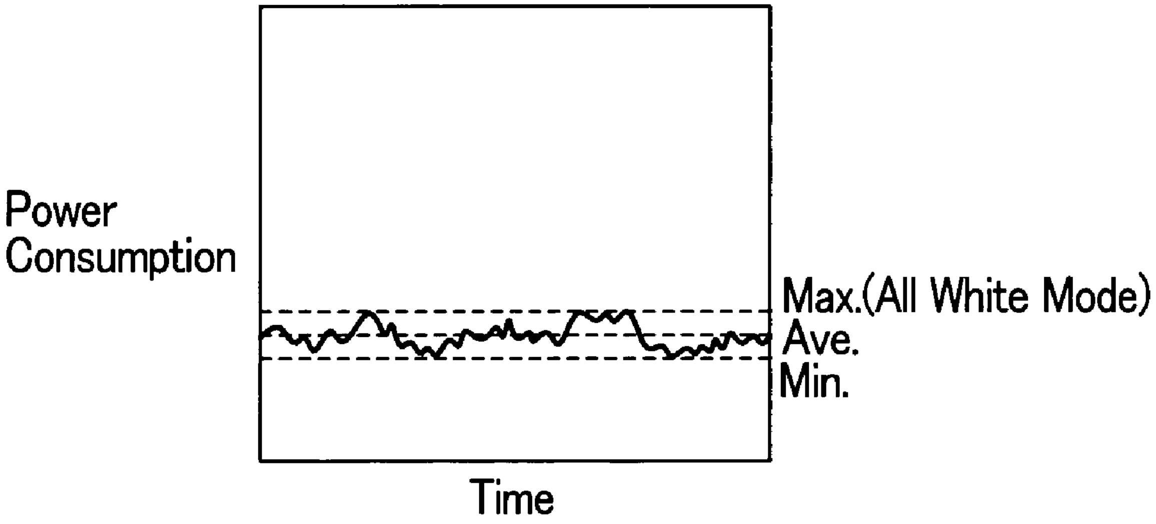

The explanation is made with respect to the power restricting driving which restricts the power consumption to the fixed value or less in the above-mentioned embodiment 1 to embodiment 3 in conjunction with FIGS. 7A and 7B. FIGS. 7A and 7B are views showing the fluctuation of the power consumption, wherein FIG. 7A shows the transition of the power consumption with respect to time when the image is displayed on the display panel 14 without performing the power restricting driving according to the present invention, while FIG. 7B shows the transition of the power consumption with respect to time when the image is displayed on the display panel 14 by performing the power restricting driving according to the present invention.

In FIG. 7A where the power restricting driving is not performed, both of the average power consumption and the maximum power consumption of all white display (also referred to as "All White Mode" and indicating an operation to display the whole area of the display screen in white which exhibits the maximum brightness) are larger than the average power consumption and the maximum power consumption in the all white display shown in FIG. 7(B) where the power restricting driving is performed. In the conventional driving method of the display device, in both of the operation in which the brightness of the display screen becomes maximum (the whole area of the display screen being displayed in white) and the operation in which the brightness of the display screen becomes minimum (the whole area of the display screen being displayed in black), the driving power supplied to the display panel from the power supply circuit is held at a fixed value. Accordingly, in the so-called all white mode display in which the brightness of the display screen becomes maximum, the driving power is largely consumed by the display panel. As a result, as shown in FIG. 7A, when a given image is displayed on the display panel for a given period, a consumption quantity of the driving power during the given period is also increased and, at the same time, an average value of the driving power consumed through the given period (average power consumption) is also increased.

To the contrary, the driving method of the display device according to the present invention, when the brightness of the display screen is increased (so-called bright image being displayed), can decrease the driving power 18 per se which is supplied to the display panel 14. Accordingly, as shown in FIG. 7B, when the whole area of display screen is displayed in white, the driving power 18 consumed by the display panel 14 can be suppressed at a low level, while a dark image is displayed on the display panel 14 without darkening the image more than the necessary level. To show a starlit sky as an example of the dark image, stars which twinkle in a pitch-black darkness are displayed with high contrast. As a result, when the given images displayed for given period using the display device are shown in FIG. 7B, as can be clearly understood by the comparison between FIG. 7A and FIG. 7B, not only the maximum power consumption but also the average power consumption are restricted.

The technical feature of the driving method of the display device according to the present invention is described as follows from a different viewpoint. Irrespective of the image signal which is fed back for the control of the driving power 18 of the display panel 14 according to the present invention, when the whole area of the screen of the display panel 14 is displayed in white, the brightness of the display screen of the display panel 14 is decreased in response to the image signal which allows the display screen to display brightly and is increased in response to the image signal which allows the display screen to display darkly.

As has been explained above, according to the display device (the driving method of the display device) of the present invention, the temperature elevation of the display panel 14 can be suppressed by restricting the average power consumption and the maximum power consumption and hence, various drawbacks attributed to the temperature elevation of the display panel 14 can be overcome whereby the reliability of the display device can be enhanced and the prolongation of the life time can be realized.

Figure 8A:
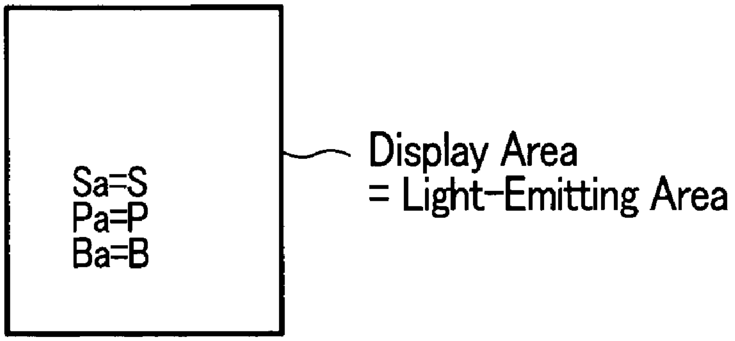
FIG. 8A to FIG. 8C are explanatory views when the restriction of the power and the restriction of a display area are performed.
Figure 8B:
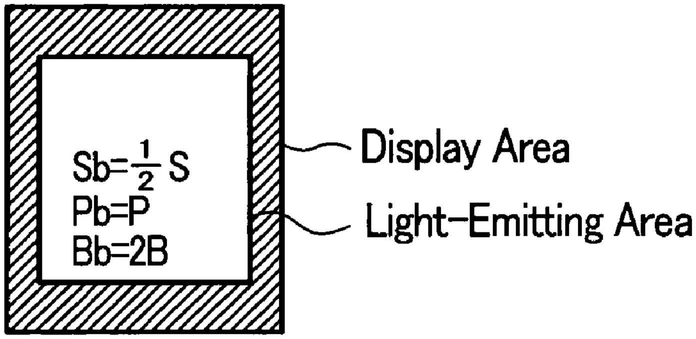
Figure 8C:
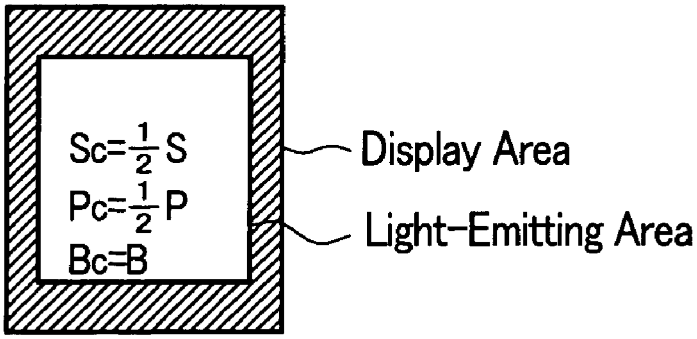

FIG. 8A to FIG. 8C are explanatory views when the power restriction and the display area restriction are performed.

That is, an area Sb of a light-emitting area shown in FIG. 8B is restricted to s/2 which is one half of an area Sa of the whole display area shown in FIG. 8A. Further, when the power restriction according to the present invention is performed, the power consumption Pb of the light-emitting area shown in FIG. 8B becomes equal to the power consumption Pa of the light-emitting area shown in FIG. 8A. That is, the power consumption Pb and the power consumption Pa assumes the same power P. Accordingly, the brightness Bb of the light-emitting area shown in FIG. 8B becomes twice as bright as the brightness Ba of the light-emitting area shown in FIG. 8A.

Here, FIG. 8C shows a case in which the power restriction according to the present invention is not performed, wherein the brightness Bc of a light-emitting area whose area is halved becomes equal to the brightness Ba of the whole display area shown in FIG. 8A. That is, the brightness Bc and the brightness Ba assume the same brightness B. In this case, although the power consumption Pc becomes one half of the power consumption Pa, when the power restriction is not performed, the difference between the power consumption shown in FIG. 8A and the power consumption in FIG. 8C becomes twice whereby the power consumption is largely fluctuated. Accordingly, it is not preferable for the prolongation of the power source and the organic EL elements whose capacitances are restricted.

Embodiment 4

Figure 9:
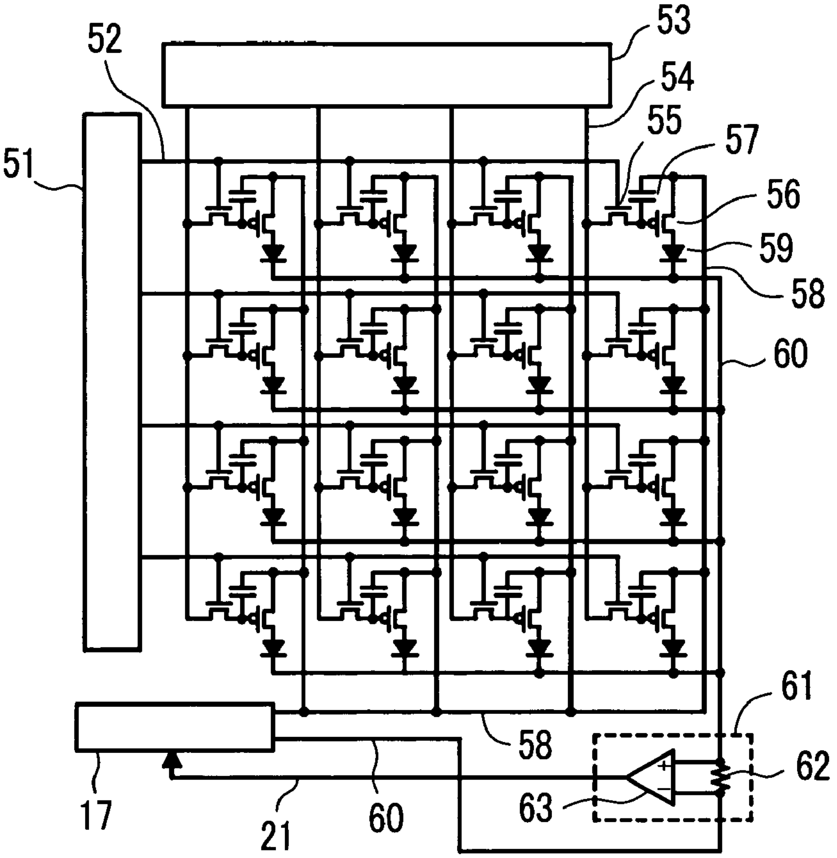
FIG. 9 is a schematic view of a display device according to the present invention (embodiment 4)

FIG. 9 is a schematic view of the display device according to the present invention and is also a view which shows the constitution of the display panel 14 shown in FIG. 1 to FIG. 3 more specifically.

In FIG. 9, a scanning signal driving circuit 51 sequentially selects scanning lines 52 in response to the control signal 16 from the control circuit 15. On the other hand, a data signal driving circuit 53 supplies the data signal to data lines 54 in response to the image signal 13 from the signal processing circuit 12.

At an intersecting portion of the scanning line 52 and the data line 54, a switching TFT 55 is arranged, wherein the scanning line 52 is connected to a gate of the switching TFT 55 and the data line 54 is connected either one of a source or a drain of the switching TFT 55. Here, when the scanning line 52 is selected, the switching TFT 55 assumes an ON state.

Another one of the source and the drain of the switching TFT 55 is connected to a gate of a driving TFT 56 and one electrode of a capacitor 57 which stores data signals. Here, the driving TFT 56 is driven in response to a data signal stored in the capacitor 57.

Either one of a source or a drain of the driving TFT 56 is connected to another electrode of the capacitor 57 and a power supply line 58 of the power supply circuit 17. Further, another one of the source and the drain of the driving TFT 56 is connected to an anode of an organic EL element 59, while a cathode of the organic EL element 59 is connected to a cathode current line 60 of the power supply circuit 17 through the cathode current line 60 and a power restricting circuit 61. Here, the driving TFT 56 drives the organic EL element 59 even after the switching TFT 55 is turned off in response to the data signal stored in the capacitor 57.

The power restricting circuit 61 includes a resistor 62 which is inserted in the cathode current line 60 and a differential amplifier 63 which has both ends thereof connected to a differential input. The power supply circuit 17 is controlled in response to the detection signal 21 from the differential amplifier 63. Here, the organic EL element 59 is driven by the driving TFT 56 in response to the data signal stored in the capacitor 57 and, at the same time, a light-emitting state of the organic EL element 59 is controlled in response to the restricted power supplied from the driving TFT 56.

Although the power restricting circuit 61 is provided in this embodiment, the power restricting circuit 61 is applicable to the detection part 20 described in the embodiment 1 to embodiment 3.

Embodiment 5

Figure 10:
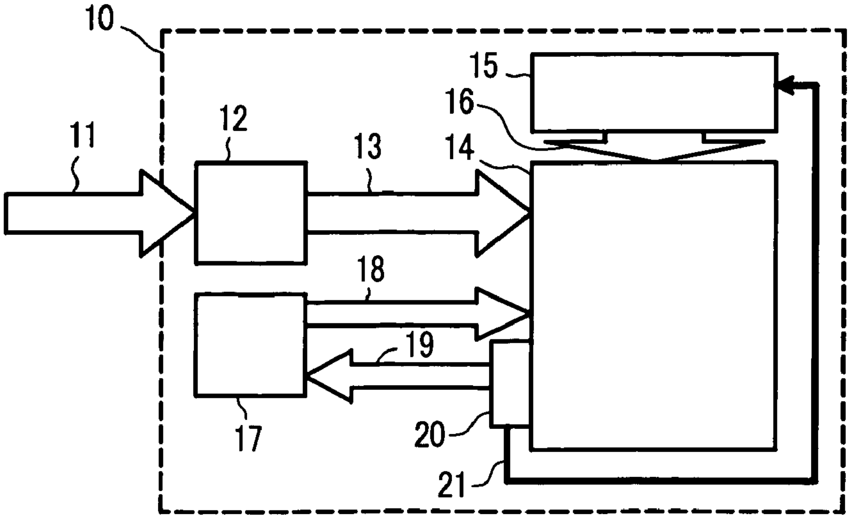
FIG. 10 is a schematic view of a display device according to the present invention (embodiment 5)

FIG. 10 shows one example which feedbacks the detection signal 21 to the control circuit 15 in the display device 10 explained in the above-mentioned embodiments 1 to embodiment 4 using FIG. 1.

To explain one example of the display panel 14 of this embodiment in conjunction with FIG. 10, the control circuit 15 controls an output period of the scanning signal outputted to the scanning lines 52 from the scanning signal driving circuit 51 using the control signal 16 outputted from the control circuit 15 in response to the detection signal 21.

The scanning signal is, for example, a voltage signal which is sequentially outputted to the scanning lines 52 and is applied to respective gates of the switching TFTs 55 which are connected to the scanning lines 52. The respective switching TFTs 55 which are connected to the scanning lines 52 to which the scanning signal is outputted are turned on during a period in which the scanning signal is applied to the gates of the switching TFTs 55, while a charge which corresponds to the image signal is fetched from the data line 54 which is connected to one of the source and drain of each switching TFT 55 to the capacitor 57 which is connected to another one of the source and the drain of the switching TFT 55. Such an operation is also referred to as the selection of the pixel (the switching TFT 55 thereof being connected to the scanning line 52) attributed to the scanning line 52.

Each pixel selected by the scanning line 52 fetches the charge corresponding to the image signal from the data line 54 during which the switching TFT is turned on, that is, the scanning signal is outputted to the scanning line 52 from the above-mentioned scanning signal driving circuit 51. In other words, even when the given data signal is outputted to the data line 54 from the data signal driving circuit 53 in response to the image signal 13 inputted to the display panel 14, the charge quantity which the pixel can fetch from the data line 54 is changed depending on the outputting period of the scanning signal which selects the pixel from the scanning signal driving circuit 51.

In this embodiment, when the image signal 13 which allows the display panel 14 to display the bright image is inputted (when the cathode current 19 is increased in the example shown in FIG. 10), the detection signal 21 shortens a period during which the scanning signal driving circuit 51 outputs the scanning signal to the scanning lines 52 through the control signal 16. To the contrary, when the image signal 13 which allows the display panel 14 to display the dark image is inputted, the detection signal 21 prolongs a period during which the scanning signal driving circuit 51 outputs the scanning signal to the scanning lines 52 through the control signal 16 than the period during which the image signal 13 which allows the display panel 14 to display the bright image is inputted.

Accordingly, when one certain pixel is always displayed with a given gray scale (brightness), a charge quantity which is fetched in the capacitor 57 provided to this one pixel is decreased when the image signal 13 which allows the display panel 14 to display the bright image is inputted, while the charge quantity which is fetched in the capacitance 57 becomes larger than the above-mentioned charge quantity when the image signal 13 which allows the display panel 14 to display the dark image is inputted.

On the other hand, in each pixel, the driving TFT 56 which is provided to the pixel controls a supply quantity (a supply period depending on a driving method) of the electric current to the organic EL element 59 provided to the pixel in response to the charge quantity stored in the capacitor provided to the pixel.

Accordingly, in this embodiment, even when the driving power 18 supplied to the display panel 14 is not adjusted in response to the image signal 13 inputted to the display panel 14, it is possible to suppress the consumption quantity of the driving power 18 in the display panel 14 at a low level with respect to the image signal 13 which allows the display panel 14 to display the bright image.

Although the detection signal 21 is fed back to the control circuit 15 in this embodiment, a function corresponding to the control circuit 15 may be provided to the scanning signal driving circuit 51 or the detection signal 21 may be fed back to the scanning signal driving circuit 51. In the latter case, for example, switching elements may be provided as a preceding stage of terminals which are connected to the respective scanning lines 52 of the scanning signal driving circuit 51 and the output period of the scanning signal maybe restricted in response to the detection signal 21.

Embodiment 6

Figure 11:
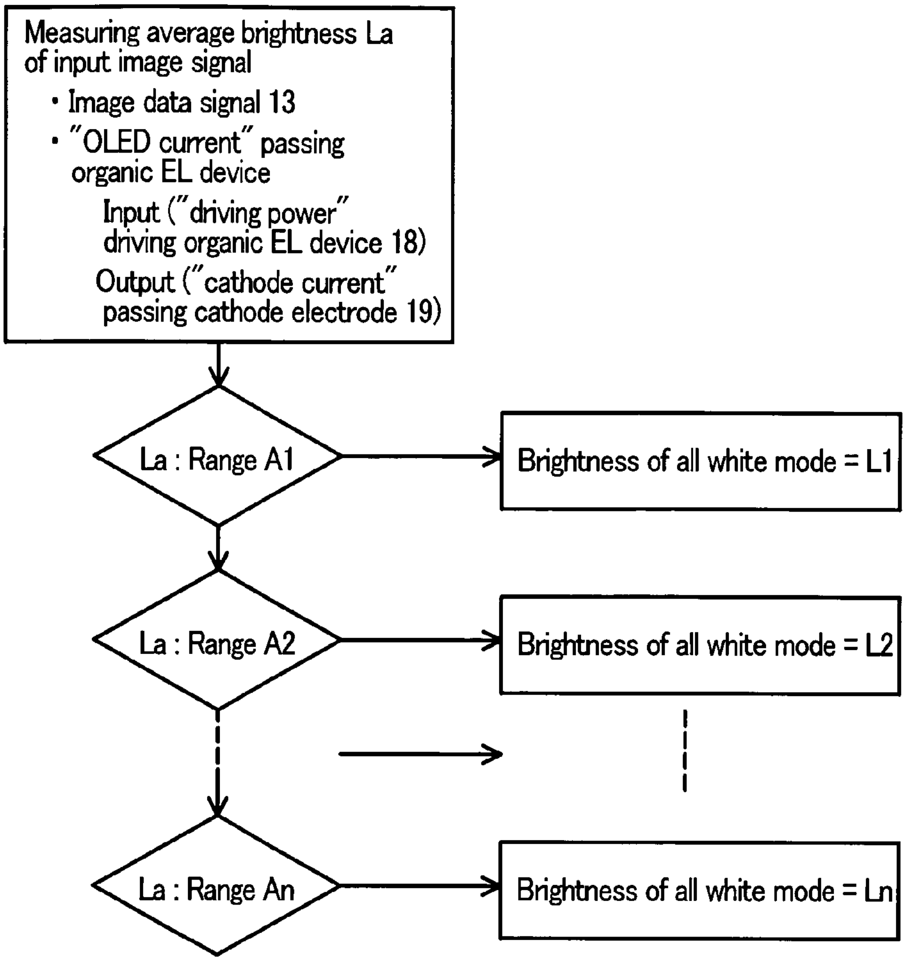
FIG. 11 is a flow chart of a driving method of a display device according to the present invention (embodiment 6)

FIG. 11 is a flow chart for explaining the driving sequence which is preferably used by the display device 10 explained in the above-mentioned embodiments 1 to 5. As described above, in the display device 10 according to the present invention, in response to the video data signal 13 inputted to the display panel 14 or the input image signal 11 to the signal processing circuit 12, the operation of at least one of the power supply circuit 17, the signal processing circuit 12, the control circuit 15, and the scanning signal driving circuit 51 is adjusted.

Accordingly, irrespective of the image signal 13 inputted to the display panel 14, the brightness of the whole area of the screen of the display panel 14 in all white display mode, that is, the brightness per unit area of the screen when the whole display screen is displayed with the maximum brightness (hereinafter referred to as brightness of all white mode) is decreased with respect to the image signal 13 which allows the display panel 14 to display the bright image and is increased with respect to the image signal 13 which allows the display panel 14 to display the black image.

In this embodiment, the average brightness of the display panel 14 (display screen) of the display device 10 explained in the embodiment 1 to embodiment 5 (different from the average brightness La shown in FIG. 11) is measured while holding the driving power 18 supplied to the display panel 14 at a fixed value and the average brightness is divided in a plurality of ranges A1 to An corresponding to the value of the average brightness.

To the respective ranges of average brightness A1 to An, the above-mentioned driving power 18 (driving current and driving voltage attributed to the driving power 18) and the adjustment quantity of the outputting period of the scanning signal from the scanning signal driving circuit 51 are individually allocated. That is, the driving method of the display device described in this embodiment, in place of allowing the image signal 13 inputted to the display panel 14 or the input image signal 11 inputted to the signal processing circuit 12 to adjust the driving power 18 or the outputting period of the scanning signal one by one in response to "brightness of image" to be displayed on the display panel 14, adjusts the driving power 18 or the outputting period of the scanning signal step by step in response to which one of the ranges of average brightness A1 to An the "brightness of image (average brightness La shown in FIG. 11)" in response to the image signal 13 or the input image signal 11 corresponds.

Figure 12:
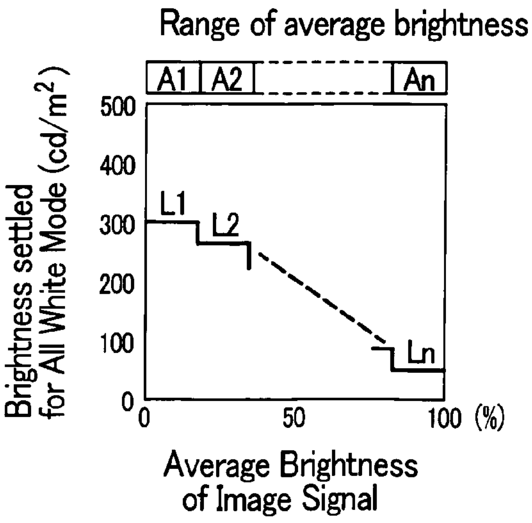
FIG. 12 is an explanatory view of a driving method of a display device according to the present invention (embodiment 6).

FIG. 12 is a view which explains one example in which the adjustment quantity of the driving power 18 or the outputting period of the scanning signal is allocated to the respective ranges of average brightness Al to An. The "average brightness of image signal" which is taken on an axis of abscissas is an average brightness which is measured over the whole area of the screen of the display panel 14 to which the fixed driving power 18 is supplied as described above, wherein the measured value of the average brightness corresponding to the image signal (the above-mentioned image signal 13 or the input image signal 11) which allows all in-plane pixels to have the maximum brightness is set to 100% and the measured value of the average brightness corresponding to the image signal which allows all pixels to have the minimum brightness is set to 0%.

The "average brightness of image signal" which is taken on an axis of abscissas is divided into the ranges of average brightness Al to An corresponding to the values. The ranges of average brightness may be divided such that the respective ranges become uniform (for example, divided in five to 20% for each range) or the respective ranges become non-uniform.

"Brightness settled for all white mode" taken on an axis of ordinates is the brightness corresponding to the driving condition set in the display panel and is calculated as the brightness of the display screen (per unit area) when the whole area of the display screen is displayed with the maximum brightness (white). To explain in more detail, the "brightness settled for all white mode" reflects the adjustment quantities of the driving powers 18 or the outputting periods of the scanning signal which respectively correspond to the ranges of average brightness A1 to An and is obtained as the brightness L1 to Ln which the whole area of the display screen is lit with the maximum brightness irrelevant to the above-mentioned image signals with the so-called respective driving conditions of the display panel 14 corresponding to the adjustment quantities. That is, the brightness settled for all white mode L1 (the adjustment quantity of the driving power 18 or the outputting period of the scanning signal corresponding to the brightness settled for all white mode L1) is allocated to the range of average brightness A1, the brightness settled for all white mode L2 is allocated to the range of average brightness A2, and the brightness settled for all white mode Ln is allocated to the range of average brightness An respectively.

Next, the "brightness of image (average brightness La)" which the image signal 13 inputted to the display panel 14 or the input image signal 11 to the signal processing circuit 12 allows the display panel 14 to display may be recognized by any one of the power supply circuit 17, the signal processing circuit 12, the control circuit 15 and the scanning signal circuit 51 to which the detection signal 21 is fed back. Further, it may be possible to provide an identification circuit of the detection signal 21 as a preceding stage of the above-mentioned circuit and to allow the circuit to adjust the driving power 18 or the outputting period of the scanning signal corresponding to any one of the identified ranges of average brightness A1 to An.

According to this embodiment, in the respective display devices 10 described in conjunction with FIG. 1 to FIG. 5, the driving conditions of the display panel 14 can be readily set in response to the inputted image signal.

What is claimed is:

1. An organic electro luminescence display device comprising:

a display panel on which a plurality of organic light emitting elements are arranged;

a control circuit which controls the display panel;

a signal processing circuit which inputs an image signal to the display panel in response to a control signal from the control circuit; and a power supply circuit which supplies and electric power to the display panel;

wherein a detection part detects an input image signal and provides a detection signal which is calculated from the input image signal;

wherein the detection signal which is provided from the detection part is fed back to the power supply circuit;

wherein the power supply circuit is connected to an anode electrode of the organic light emitting element through a driving thin film transistor and is connected to a cathode electrode of the organic light emitting element through a power restricting circuit;

the power restricting circuit including a resistor connected between a differential amplifier and the cathode electrode of the organic light emitting element for outputting a feedback signal to the power supply circuit;

wherein the power supply circuit restricts the electric power supplied to the display panel to a fixed or less in response to the detection signal from the detection part which detects a brightness level of the input image signal and in response to the feedback signal from the power restricting circuit; and wherein the image signal, provided by the signal processing circuit, is supplied to the display panel.

2. A display device according to claim 1, wherein the detection signal which is provided from the detection part is fed back to the power supply circuit and to the signal processing circuit; and wherein, the power supply circuit and the signal processing circuit restrict the electric power supplied to the display panel to a fixed value or less in response to the detection signal.

* * * * *